June 15, 1937.  W. SCHULZ  2,084,165
CINEMATOGRAPHIC FILM SPOOL
Filed Feb. 19, 1936
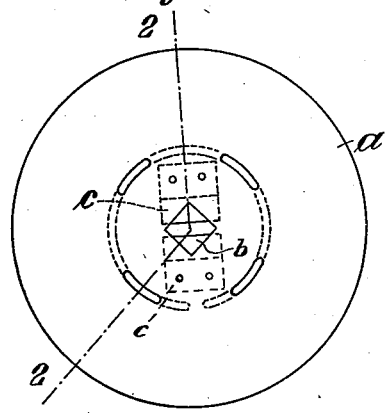
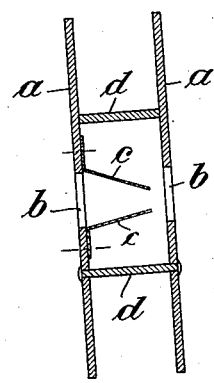
Walter Schulz
Inventor
By His Attorney Patented June 15, 1937

2,084,165

UNITED STATES PATENT OFFICE 2,084,165

CINEMATOGRAPHIC FILM SPOOL

Walter Schulz, Berlin-Friedrichshagen, Germany, assignor to Agfa Ansco Corporation, Binghamton, N. Y., a corporation of New York Application February 19, 1936, Serial No. 64,708
In Germany February 21, 1935

3 Claims. (Cl. 242—70)

This invention relates to a cinematographic film spool.

One of its objects is to provide an improved cinematographic film spool. Further objects will be seen from the detailed specification following hereafter. Reference is made to the accompanying drawing in which:

Fig. 1 shows an end view of a cinematographic film spool in accordance with the invention, and Fig. 2 shows a section of the film spool on the line 2—2 of Fig. 1.

In order to prevent film spools from being placed in incorrect position on the guide and driving axles of cine-cameras and projection apparatus, it has been proposed to give the opening in one flange of a cinematographic film spool a shape which differs from that in the other flange. Thus it is known practice to provide the spool flange on one side with a round opening and on the other side with an angular opening, or to provide the flanges on both sides with angular openings, the opening at one side having a different number of corners to that at the other side, or openings which resemble a toothed wheel, the number of teeth on the respective sides being different.

The present invention solves in the simplest manner the problem of preventing a cinematographic spool from being placed incorrectly on the guide or driving axles of cine-cameras or projection apparatus. According to the invention there is fitted in the interior of the spool shaft passage a tongue or similarly shaped member which moves aside when the spool is placed correctly in the apparatus but which prevents the spool from being placed incorrectly on the axle. If, for example, as in the attached drawing, a small plate-shaped spring is fitted obliquely between square flange openings in the shaft passage of the spool and approximately diagonally with respect to the square openings, then a square shaft can be inserted in the spool from the rear side but not from the front side. The spring described above can also be used with advantage on film spools with round flange openings; in this case the obliquely inserted plate provides a resilient support for a shaft having a flattened side which engages the spring.

Spools according to the invention may contain two or more obstruction members in the interior of the spool shaft.

A form of construction is illustrated in the drawing by way of an example. The spool flanges are denoted by $a$ and the openings in the flanges are denoted by $b$; $c$ denotes a flexible obstruction member which, as shown in Fig. 1, obstructs a part of the flange opening. This obstruction member $c$ can be fixed in any desired manner either on a spool flange or on the hub $d$ connecting the spool flanges.

On the spools there may also be fitted a plurality of such obstruction members $c$ which from one side only permit the passage of axles having a definite cross-sectional shape, and from the other side either spool axles of any desired cross-sectional shape or of another definite cross-sectional shape. The obstruction member or members can be arranged in such a manner that only axles of quite definite cross-sectional shape can be inserted from each side, or they may be so formed that axles of any desired cross-sectional form can pass through from one side only.

What I claim is:

1. A cinematographic film spool comprising two flanges each provided with an opening for the introduction of an axle, a hub connecting said flanges, and an obstruction member mounted within said hub for preventing the introduction of an axle into said hub from one side of said spool and permitting introduction from the other side.

2. A cinematographic film spool comprising two flanges each provided with an opening for the introduction of an axle, a hub connecting said flanges, and a plurality of obstruction members mounted within said hub for preventing the introduction of an axle into said hub from one side of said spool and permitting introduction from the other side.

3. A cinematographic film spool comprising two flanges each provided with an opening for the introduction of an axle, a hub connecting said flanges, and a spring provided on one of said flanges and projecting towards the interior of said spool so as to substantially mask one of said openings thereby preventing the introduction of an axle into said opening.

WALTER SCHULZ.